United States Patent [19]

Gregory

[11] 3,989,206
[45] Nov. 2, 1976

[54] ROTATING LAUNCH DEVICE FOR A REMOTELY PILOTED AIRCRAFT

[75] Inventor: Thomas J. Gregory, Saratoga, Calif.

[73] Assignee: The United States of America as represented by the Administrator of the United States National Aeronautics and Space Administration, Washington, D.C.

[22] Filed: Aug. 28, 1975

[21] Appl. No.: 608,483

[52] U.S. Cl. .................................. 244/63; 124/6
[51] Int. Cl.² .................................... B64F 1/06
[58] Field of Search .......... 244/63; 89/1.701, 1.819; 46/81; 272/31 A; 273/98, 101; 124/6, 8

[56] References Cited
UNITED STATES PATENTS
1,748,663  2/1930  Tucker ............................ 244/63

OTHER PUBLICATIONS
"A Captive Composite", *Flight* 1/23/1941.

*Primary Examiner*—Trygve M. Blix
*Assistant Examiner*—Barry L. Kelmachter
*Attorney, Agent, or Firm*—Darrell G. Brekke; Gary F. Grafel; John R. Manning

[57] ABSTRACT

A method and apparatus for launching a remotely piloted aircraft is disclosed wherein the aircraft, is revolved about a fixed pivot point until a pretermined speed is reached whereupon the vehicle is released from the launching apparatus. The vehicle is attached to one end of a rotatable arm, the imbalance on the arm being counteracted by a counter weight attached to the opposite end. The counter weight is released from the arm at the same time as the aircraft so as to avoid structural damage to the apparatus caused by rotation in the unbalanced condition. The arm is oriented such that it rotates in a plane inclined obliquely to the local gravitational field of the launch site. The supporting structure for the arm may be made stationary, or may be attached to a mobile vehicle for ground transportation.

13 Claims, 4 Drawing Figures 3,989,206

ROTATING LAUNCH DEVICE FOR A REMOTELY PILOTED AIRCRAFT

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

1. Field of the Invention

This invention relates to means for launching a remotely piloted aircraft. More specifically, the invention is directed toward a structure for revolving the remotely piloted aircraft about a fixed axis in a plane that is inclined obliquely to the local gravitational field of the launch site.

2. Description of the Prior Art

The basic concept of launching an aircraft by attaching it to a structure which revolves about a fixed axis and subsequently releasing it from the structure is well known in the art. The apparatus utilized by these prior art teachings revolves the aircraft in a circular path having a vertical or horizontal axis, and is generally cumbersome and complex. Among the disadvantages of the prior art devices are that the aircraft is typically attached to the launch apparatus at the wing tip, which causes high acceleration loads along the wing spar in a direction perpendicular to the aircraft fuselage. This requires the aircraft to have structure which increases its strength to enable launching, but which is totally unnecessary during flight. Obviously, such structure increases aircraft weight and decreases aircraft payload. Additionally, when the launching apparatus and the aircraft are at rest, the aircraft is suspended so far above the ground as to make routine maintenance and servicing difficult, if not impossible. The prior art launching devices that have a horizontal axis and revolve in a vertical plane require complex supporting devices at each end of the axis in order to avoid large cantilevered loads. in this type of launch device, the aircraft is usually supported by its fuselage such that its wing span is parallel to the axis of the axle, which further requires that the supporting structures be separated by a greater distance to avoid collision with the aircraft. This, in turn, necessitates a relatively large area in which to erect and maintain the launch device.

Those prior art devices which utilize rigid arms supporting the aircraft are also subject to severe stress due to the vibration caused by rotation of the unbalanced arm during the launch. If counterweights are provided to offset the weight of the aircraft, the structure still suffers vibration stress when the aircraft is released due to the imbalance generated by the counterweight. These factors require the prior art launch devices to have complex and cumbersome support structures to provide the necessary rigidity.

SUMMARY OF THE INVENTION

The present invention is directed toward apparatus for launching a remotely piloted aircraft wherein the aircraft is attached to one end of a rigid arm and whirled around in a circular path until attaining flying speed. The circular path lies in a plane which is disposed obliquely to the gravitational field of the launch site enabling the aircraft to be released at relatively high initial altitude. The rigid arm is attached to an axle which is supported in a tripod-like base structure. The base structure may be attached to a mobile vehicle, such as a truck, or may be positioned in a permanent launch site.

The vibration stresses in the base structure generated by rotating the aircraft are minimized by providing a counterweight on the opposite end of the rigid arm. The counterweight is released simultaneously with the aircraft to prevent an unbalanced condition after the aircraft is launched. Since minimal vibration stresses are encountered, the base structure is lighter and simpler than those of the prior art devices.

The orientation of the counterbalanced rotating arm in an inclined plane also permits servicing of the aircraft while it is attached to the arm by positioning it at the lower end of the inclined plane. The arm is caused to rotate by the propulsion system on board the aircraft, thus eliminating the requirement for a separate power supply.

It is an object of this invention to provide a device for launching a remotely piloted aircraft which sustains low structural loads to minimize the weight and complexity of the launching device. This is accomplished in the instant invention by providing a counterbalance weight on the end of the rotating arm opposite that from which the aircraft is attached, and simultaneously releasing the counterbalance weight from the arm along with the aircraft.

It is a further object to provide such a launching structure which launches the aircraft at a relatively high initial altitude while at the same time provides easy access to the aircraft for servicing and maintenance.

It is a further object of the invention to provide a remotely piloted aircraft launching apparatus wherein a counterbalanced arm is rotated about an axle which requires only one end of the axle to be supported.

DETAILED DESCRIPTION OF THE PREFERRED EMBODIMENT

Figure 1:
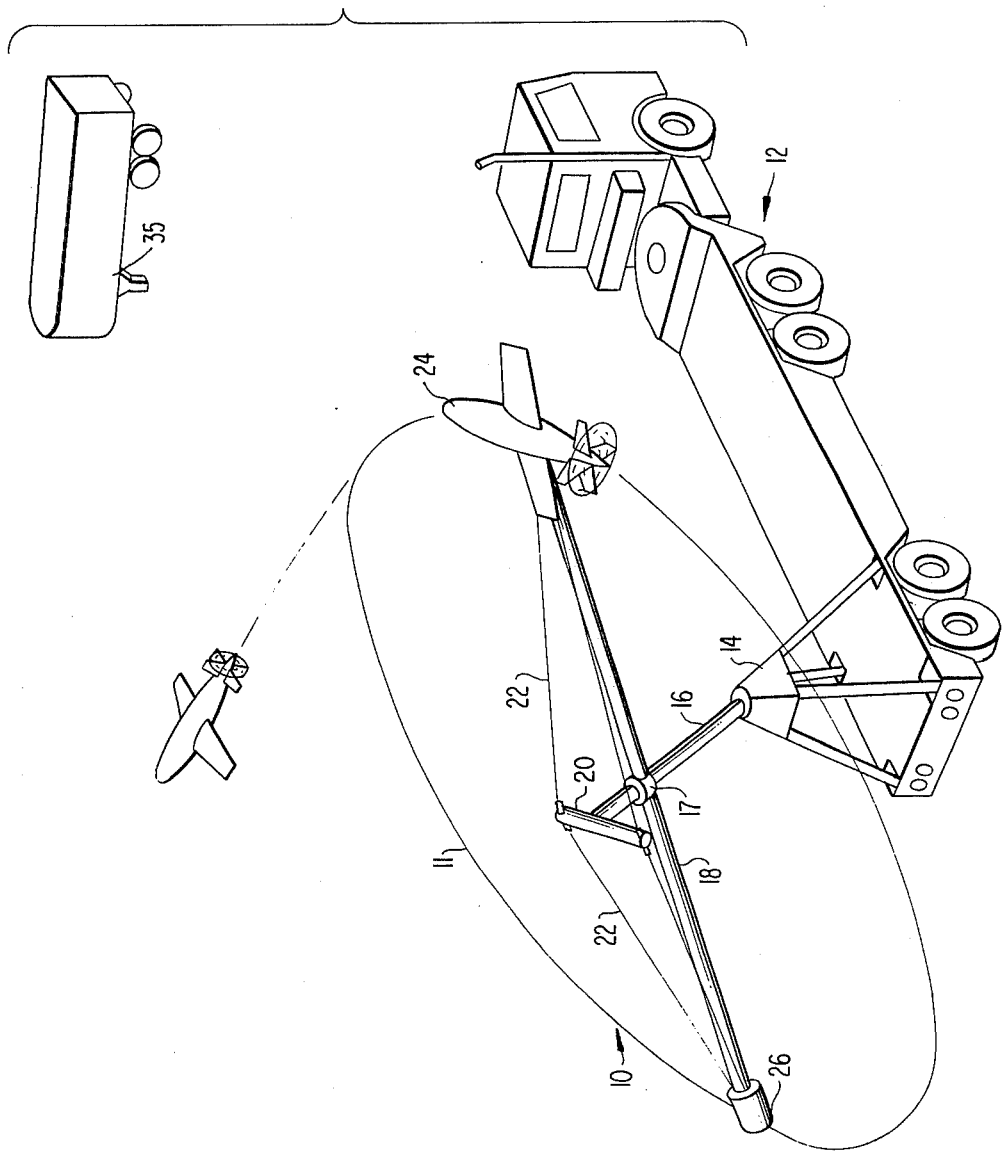
FIG. 1 is a perspective view of the launching system according to the present invention.

The rotating launching device for a remotely piloted aircraft according to the invention is shown generally at 10 in FIG. 1. It is shown attached to a truck 12, but obviously other mobile vehicles may be utilized or, the rotating launching structure may be affixed to the ground in a stationary position. The launching device consists of a tripod-like base 14 having a plurality of legs supported by the truck 12. An axle 16 has one end supported in the upper portion in the base structure 14. Arm 18 is attached to axle 16 by bearing 17 such that arm 18 rotates with respect to the axle. Cross member 20 is attached to the end of the axle 16 so as to rotate with respect to the axle. Guywires 22 are attached between the cross member 20 and each end of the arm 18. The use of guywires 22, which are placed in tension, provides the requisite structural rigidity without substantially increasing the mass of the rotating structure.

Figure 2:
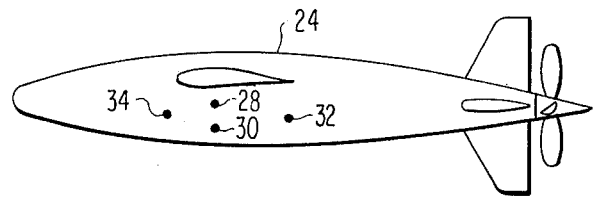
FIG. 2 is a side view of the remotely piloted vehicle showing the points of attachment to the rotatable arm.

Remotely piloted aircraft 24 is attached to one end of arm 18, while counterweight 26 is attached to the opposite end. The aircraft 24 is attached to the arm 18 utilizing a three point attachment such as shown in FIG. 2. The circular path traveled by aircraft 24 and counterweight 26 is represented by the line designated by reference numeral 11. The attachment points 28 and 30 are disposed in a plane, while the third attachment point may be behind points 28 and 30, as shown by attachment point 32, or alternatively, the third attachment point may be ahead of points 28 and 30, as shown at 34. Thus, attachment points 28 and 30 are disposed above and below the plane of rotation while attachment point 32 is in the plane of rotation to give tripod-type stability to aircraft 24 during launch. Any means may be utilized to physically attach the aircraft 24 to the arm 18, such as the attachment means shown in FIG. 9 of U.S. Pat. No. 3,038,383. Preferably, the attachment hardware is such that it forms a smooth outer contour of the aircraft so as to minimize air turbulence and drag.

In operation, the aircraft and counterweight are attached to the arm 18 as shown in FIG. 1 and the axle and arm are caused to rotate due to the thrust generated by the aircraft power plant. When the aircraft has reached its flying speed, the launch sequence is initiated from remote control center 35 and the aircraft and counterweight are simultaneously released from the arm 18. The axis 16 is inclined obliquely to the local gravitational field of the launch such that the arm 18 rotates in a plane which is also disposed obliquely to the local gravitational field. The rotation of the arm 18 in such an obliquely disposed plane enables the aircraft to be launched at a relatively high initial altitude and to be oriented in a climb attitude if desired. Also, the counterweight is released when its end of the arm 18 is traveling in a slightly downward direction thereby minimizing the danger to surrounding areas caused by the released counterweight. The oblique plane of rotation is also advantageous for servicing and performing routine maintenance on the aircraft 24 since, when it is located in the lowermost position of its circular path of travel, the aircraft is easily accessible from the ground.

Figure 4:
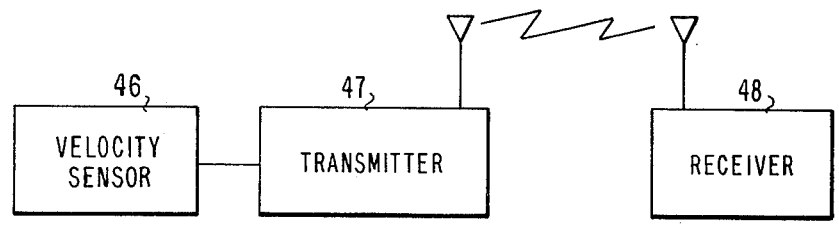
FIG. 4 is a schematic diagram of the telemetry system to transfer velocity information.

The attachment means coupling the aircraft 24 and the counterweight 26 to the arm 18 is released when the aircraft has achieved sufficient speed and is in the proper orientation for launching. A telemetry system is preferably used to keep the remote control center 35 informed of the velocity of the aircraft on a real time basis. The velocity of the aircraft is sensed by velocity sensor 46 (FIG. 4) which is coupled to transmitter 47. An r-f signal, modulated with the velocity information, is transmitted from transmitter 47 on aircraft 24 to a receiver 48 located in remote control center 35. The speed of the aircraft can be sensed by any means known in the art and the sensing means per se forms no part of this invention.

Any means for sensing the speed of the aircraft may be used which will transmit an indication of the speed to the remote control center to prevent launching before the aircraft has reached flying speed and to prevent structural damage to the launching device or the aircraft caused by too high a speed.

Figure 3:
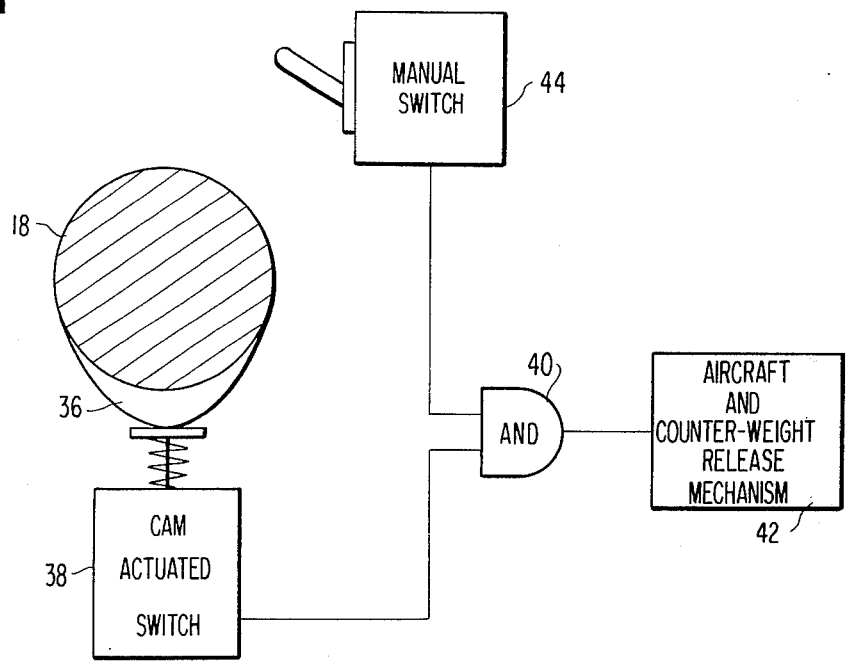
FIG. 3 is a schematic diagram of the actuating circuit for the release mechanism.

After the aircraft has achieved its desired speed, it still must not be launched until it is in the proper position. Preferably, the aircraft is launched at the highest point on its path to achieve maximum initial altitude; however, it may be released on the upward side of the path in order to release it in a climb attitude. To insure that neither the aircraft nor the counterweight are released until they are in their proper orientation, arm 18 is provided with cam 36 as shown in FIG. 3. Cam 36 actuates switch 38 connected to an electrical source (not shown) which provides an input signal to AND gate 40. The AND gate 40 is also connected to manual switch 44. Switch 44 is preferably located in the control center 35 and is positioned to provide an input signal to the AND gate by the pilot when the aircraft has achieved its desired speed. As illustrated in FIG. 3, the release mechanism 42 is actuated only when inputs from both the manual switch 44 and the cam actuated switch 38 are provide to AND gate 40.

The aircraft release mechanism releases the aircraft such that all the attachment points between the aircraft 24 and the arm 18 are released at the same point on the circular path of travel. Identical attachment points between arm 18 and counterweight 26 are released at the same instant as those on aircraft 24. This requires that the forwardmost attachment point, or points, be released before releasing the rearwardmost attachment points, or point. If all the attachment points were released at the same time, the paths of travel of the points would be tangent to the circular path at their point of release. However, due to their different position on the circumference of the circular path, the tangents are not in the same direction and, therefore, the aircraft would continue to rotate in the plane of rotation even after release. Release of all the attachment points at the same position on the circular path eliminates this spinning tendency and allows the aircraft to travel in a true tangent to the point of release until remote control is established.

What we claim is:
1. Apparatus for launching a remotely piloted aircraft from a launch site comprising:
   a. a rotatable arm having first and second ends;
   b. means to support the rotatable arm such that the arm rotates in a plane disposed obliquely to the gravitational field at the launch site;
   c. means to releasably attach the remotely piloted aircraft to a first end of the arm such that thrust generated by the aircraft powerplant causes the rotatable arm to rotate;
   d. a counterweight;
   e. means to releasably attach the counterweight to a second end of the arm; and
   f. means to simultaneously release the attachment means for the aircraft and the counterweight so as to release them from their respective ends of the arm at a predetermined point on the circular path of travel.

2. The apparatus of claim 1 wherein the means to support the rotatable arm comprises:
   a. an axle oriented perpendicular to the plane of rotation of the arm;
   b. means to rotatably attach the arm to said axle; and
   c. a base structure attached to said axle to maintain the axle in a fixed position.

3. The apparatus of claim 2 wherein the base structure is attached to a mobile ground vehicle.

4. The apparatus of claim 2 wherein the arm is rotatably attached to the axle at the mid-point of the arm.

5. The apparatus of claim 1 wherein the means to releasably attach the aircraft to the arm comprises:

a. first and second attachment devices on the aircraft disposed above and below the plane of rotation of the arm and releasably engaging corresponding devices on the first end of the arm; and b. a third attachment device located on the aircraft rearwardly of the first and second devices and releasably engaging a corresponding device on the arm.

6. The apparatus of claim 5 wherein the means to release the aircraft releases all the attachment devices at the same predetermined point on the circular path of travel to eliminate angular motion of the released aircraft.

7. The apparatus of claim 1 wherein the means to releasably attach the aircraft to the arm comprises:

a. first and second attachment devices on the aircraft disposed above and below the plane of rotation of the arm and releasably engaging corresponding devices on the arm; and b. a third attachment device located on the aircraft forwardly of the first and second devices and releasably engaging a corresponding device on the arm.

8. The apparatus of claim 7 wherein the means to release the aircraft releases all the attachment devices at the same predetermined point on the circular path of travel to eliminate angular motion of the released aircraft.

9. The apparatus of claim 1 further comprising means to sense the speed of the aircraft and transmit an indication of the speed to a remote control point.

10. The apparatus of claim 1 further comprising: first, manually operated means to provide a first actuating signal to the simultaneous release means; and second means, operated by the arm when the arm reaches a predetermined position, to provide a second actuating signal to the simultaneous release means such that the release means releases the aircraft and counterweight upon receipt of the first and second actuating signals.

11. The apparatus of claim 10 wherein the second means comprises a cam operated switch connected to the simultaneous release means, and a cam surface formed on the arm so as to operate said switch and provide the second actuating signal to the release means when the arm is in a predetermined position.

12. The apparatus of claim 1 wherein the means to releasably attach the aircraft and the counterweight are of identical construction.

13. A method for launching a remotely piloted aircraft from a launch site comprising the steps of:

a. attaching the aircraft to one end of a rotatable arm;

b. attaching a counterweight to the other end of the rotatable arm;

c. rotating the arm about a fixed axis such that the aircraft travels in a circular path, the plane of the circular path being disposed obliquely to the local gravitational field of the launch site; and d. simultaneously releasing the aircraft and counterweight from the arm at predetermined points on the circular path of travel.

* * * * *